United States Patent
Costello et al.

(10) Patent No.: US 9,573,692 B1
(45) Date of Patent: Feb. 21, 2017

(54) IN CANOPY BLEED AIR ACTUATOR WITH MESH VENT

(71) Applicant: Earthly Dynamics, LLC, Atlanta, GA (US)

(72) Inventors: Mark F Costello, Atlanta, GA (US); Michael Brian Ward, Atlanta, GA (US); Edward James Scheuermann, Atlanta, GA (US); Keith Bergeron, Framingham, MA (US); Michael Wayne Shurtliff, Ashland, MA (US); Gregory Michael Noetscher, Shrewsbury, MA (US)

(73) Assignee: Earthly Dynamics, LLC, Atlanta, GA (US)

( * ) Notice: Subject to any disclaimer, the term of this patent is extended or adjusted under 35 U.S.C. 154(b) by 108 days.

(21) Appl. No.: 14/709,606

(22) Filed: May 12, 2015

Related U.S. Application Data

(63) Continuation-in-part of application No. 14/479,530, filed on Sep. 8, 2014, now Pat. No. 9,428,277.

(51) Int. Cl.
| | | |
|---|---|---|
| B64D 17/34 | (2006.01) | |
| B64D 17/22 | (2006.01) | |
| B64D 17/18 | (2006.01) | |
| B64D 17/02 | (2006.01) | |

(52) U.S. Cl.
CPC ............ B64D 17/34 (2013.01); B64D 17/18 (2013.01); B64D 17/22 (2013.01); *B64D 17/025* (2013.01)

(58) Field of Classification Search
CPC ...... B64D 17/025; B64D 17/18; B64D 17/20; B64D 17/22; B64D 17/34; B64D 17/343; B64C 31/036; B64C 2031/065
See application file for complete search history.

(56) References Cited

U.S. PATENT DOCUMENTS

| | | | | |
|---|---|---|---|---|
| 3,104,857 A | * | 9/1963 | Knacke et al. | ...... B64D 17/025 244/145 |
| 3,117,753 A | | 1/1964 | Ewing | |
| 3,822,844 A | | 7/1974 | Sutton | |

(Continued)

FOREIGN PATENT DOCUMENTS

| | | |
|---|---|---|
| DE | 4114520 C1 | 10/1992 |
| FR | 2633248 A1 | 12/1989 |
| GB | 2468760 A | 9/2010 |

OTHER PUBLICATIONS

Gavrilovski et al., Parafoil Control Authority with Upper-Surface Canopy Spoilers, J. Aircraft, vol. 49, No. 5, Sep.-Oct. 2012, pp. 1391-1397.

(Continued)

*Primary Examiner* — Tien Dinh
*Assistant Examiner* — Richard R Green
(74) *Attorney, Agent, or Firm* — Moore Ingram Johnson & Steele

(57) ABSTRACT

A system is described to control the flight path of a parafoil. The physical control mechanism is a series of actuators embedded within the parafoil canopy that open a series of meshed venting systems in the upper surface of the parafoil canopy. Opening and closing the meshed venting system changes the forces and moments acting on the parafoil canopy in a consistent manner such that it can be used for flight control. The meshed venting system includes an internal sealing flap and a mesh member.

20 Claims, 5 Drawing Sheets

(56) References Cited

U.S. PATENT DOCUMENTS

| | | | |
|---|---|---|---|
| 4,175,722 A | 11/1979 | Higgins | |
| 4,771,970 A * | 9/1988 | Sutton | B64D 17/025 244/145 |
| 5,102,071 A * | 4/1992 | Rieleit | B64D 17/025 244/142 |
| 6,669,146 B2 | 12/2003 | Lee | |
| 8,210,479 B2 | 7/2012 | Fox | |
| 8,215,587 B2 * | 7/2012 | Mullins | B64D 17/025 244/123.11 |
| 8,489,256 B2 | 7/2013 | Yakimenko | |
| 2002/0134890 A1 | 9/2002 | Berzin | |
| 2007/0272801 A1 | 11/2007 | Hilliard | |
| 2011/0315826 A1 | 12/2011 | Brocklebank | |
| 2014/0204801 A1 | 7/2014 | Bordetsky | |

OTHER PUBLICATIONS

Ward et al., Autonomous Control of Parafoils Using Upper Surface Spoilers, AIAA Aerodynamic Decelerator Systems Conference, Mar. 2013, Daytona Beach, Florida.

* cited by examiner

IN CANOPY BLEED AIR ACTUATOR WITH MESH VENT

CROSS-REFERENCE TO RELATED APPLICATION

The present application is a continuation-in-part of U.S. Ser. No. 14/479,530 filed Sep. 8, 2014. The subject matter of that application is hereby incorporated by reference in its entirety.

STATEMENT OF GOVERNMENT INTEREST

The work that lead to certain aspects of this invention was supported in part by the U.S. Army Natick Soldier Research, Development and Engineering Center. Thus, the United States Government may have certain rights to this invention.

FIELD OF THE INVENTION

The present invention relates to a meshed venting system for a series of upper surface canopy spoilers within a parafoil of an aerial delivery system that are controlled by in-canopy actuators.

BACKGROUND OF THE INVENTION

Aerial payload delivery systems, also known as ram canopy parachute systems, offer the capability to deliver large payloads and or people to undeveloped or inaccessible locations. The canopies in these systems are well known and often referred to as parafoils from which payloads may be suspended via rigging lines or control lines. The parafoils are generally constructed of an upper canopy and a lower canopy connected by a cell structure, also known as ribs, that is well known in the art. The flexible parafoils provide aerodynamic lift by virtue of shape of the canopy and an alteration in the shape can greatly affect the directionality of the parafoil.

Several autonomous guided systems have been developed that use trailing edge brake deflection for lateral control by altering the shape of the parafoil that have been shown to increase landing accuracy. The control of internal air, referred to as ram air, vented through the upper surface of the canopy creating aerodynamic spoilers has been shown to improve glide slope control. The released ram air is called bleed air. Such known autonomous systems have involved altering the control lines from a device, such as an actuator, on or within the payload to alter the shape of the parafoil. These known control lines create aerodynamic drag and can become tangled or damaged upon deployment resulting in loss of control and landing accuracy. Known systems have not provided the necessary accuracy, have been unsuccessful, and distort the canopy causing it to collapse.

U.S. patent application Ser. No. 14/479,530, the disclosure of which is incorporated by reference describes the use of an actuator embedded within the parafoil that controls a series of slits or spoilers in the upper surface of the canopy releasing a portion of the ram air inflating the parafoil. Opening and closing the spoilers by actuation alters the amount of bleed air and changes the forces and moments acting on the parafoil in a consistent manner such that it can be used for flight control. Accordingly, a method to increase the amount of bleed air without altering the aerodynamic efficiency of the canopy would increase glide slope control and landing accuracy.

SUMMARY OF THE INVENTION

The present invention relates to an actuator system to control the flight path of a parafoil used in combination with upper surface canopy spoilers created by vents or apertures in the upper canopy. A mesh member is placed on top of the canopy to cover the vents and allow for deformation of the fabric below the mesh member, without deforming the shape of the canopy. The physical control mechanism is an in canopy actuator that opens a series of vents in the upper surface releasing a portion of the ram air inflating the parafoil. The released ram air is known as bleed air. Opening and closing the vents by actuation alters the amount of bleed air and changes the forces and moments acting on the parafoil in a consistent manner such that it can be used for flight control.

The parafoil control system of the present invention comprises a parafoil and a plurality of upper-canopy apertures or vent systems to create spoilers wherein each vent system further comprises a sealing flap and a mesh member. Each sealing flap is connected to an actuator by a control line to control the parafoil, improve glide slope control and improve landing accuracy. A control module is used for communication with the actuator.

The parafoil of the present invention is elliptical in planform comprising an upper canopy and lower canopy attached by a cell structure, thereby creating cell walls. It is understood that the planform may be rectangular or any other aerodynamically effective shape. Load bearing, or structural cell walls are cell walls that have a payload rigging line at the intersection of the cell wall and the lower canopy. Non-load bearing, or non-structural cell walls do not have a payload rigging line attached at the intersection of the lower canopy and the cell wall. The upper canopy of the parafoil comprises meshed vent systems to create spoilers across a number of cells in the center section of the canopy. The meshed vent systems are located preferably between 5% and 100% of chord length from the leading edge, most preferably 20-50%. Chord length is the distance from the leading edge of the parafoil to the trailing edge. In a preferred embodiment of the present invention, the meshed vent systems are preferably located across the center 1%-100% of the cells of the canopy, more preferably 50%-85%. Each cell comprising a meshed vent system may comprise multiple meshed vent systems.

In a preferred embodiment, the aperture or vent shape is an isosceles trapezoid wherein the bases are parallel and the longer of the two bases is closest to the leading edge of the parafoil and spans the entire width of the cell. The length of the vent is the distance between the leading edge of the vent and the trailing edge of the vent. It is understood that any vent shape may be used including, but not limited to curvilinear triangle, trapezium, oval, triangle, and hexagon. Moreover, the vent may be any length or size.

In a further embodiment of the present invention, an internal sealing flap is attached to the bottom of the upper canopy at the leading edge of the vent and extends across the vent to seal the vent when the spoilers are not actuated. In a preferred embodiment, the internal sealing flap extends beyond the trailing edge of the vent by at least two inches. However, it is understood that the sealing flap may be any length or size that allows the vent to seal. The internal sealing flap may be attached to the canopy by any means appropriate including, but not limited to sewing, taping, gluing and taking. Alternatively, the internal sealing flap may be part of the upper canopy material and/or be comprised of the upper canopy material that was eliminated to create the vent.

In a preferred embodiment, the vent of the present invention is further covered by a mesh member to prevent deformation of the canopy by the release of bleed air. The mesh member is a polyester mesh with heat set finish and 0.24 inch openings, however, it is understood that any mesh or mesh-like material that allows for the release of bleed air may be used. In a preferred embodiment, the mesh member is attached on the top of the canopy upper surface and extends beyond the leading edge of the vent towards the leading edge of the parafoil to allow the fabric of the canopy underneath to deform. In a further preferred embodiment, the length of the mesh member from leading edge to trailing edge is approximately twice the length of the vent and extends beyond the leading edge of the vent by approximately the length of the vent. However, it is understood that the mesh member may be of any length or shape needed to prevent deformation of the canopy. Alternatively, the mesh may be, placed on the bottom of the upper surface between the canopy and the internal sealing flap. The mesh may be attached to the canopy by any means appropriate including, but not limited to sewing, taping, gluing and tacking.

In another preferred embodiment of the present invention, the vent in the upper canopy may be formed by creating a plurality of apertures in close proximity within the upper canopy of the cell wherein the internal sealing flap extends across all of the apertures within that vent system. The plurality of apertures of this embodiment thereby create an upper canopy mesh member. It is understood that a cell may contain multiple vent systems comprising upper canopy mesh members. The apertures may be of any size or shape. A second mesh member may then be attached on the top of the canopy upper surface and extends beyond the leading edge of the apertures towards the leading edge of the parafoil to allow the fabric of the canopy underneath to deform. It is understood that the second mesh member may be of any length or shape needed to prevent deformation of the canopy. Alternatively, the second mesh member may be placed on the bottom of the upper surface between the canopy and the internal sealing flap. The second mesh member may be attached to the canopy by any means appropriate including, but not limited to sewing, taping, gluing and tacking.

In a preferred embodiment of the present invention, the actuator comprises a main housing unit, a gear motor and means to control the motor, a spool or winch drum, electronics for control of the actuator, and a means to provide power to the actuator. It is understood that the actuator may comprise several means for actuation and may actuate multiple control lines. In another preferred embodiment, the actuator comprises a power source comprising a Lithium-ion polymer (LiPo) battery, an embedded microprocessor and magnetic rotary encoder for position feedback control for the spool, a transceiver for communication with the control module, and a sleep mode that eliminates the need to turn on each actuator prior to flight. It is understood that any type of actuator may be used and that the power source for the actuator may be provided by any source of stored energy such as a solar, kinetic or magnetic. The main housing unit of the preferred embodiment of the present is cylindrical and approximately four inches in height and one-inch in diameter. However, it is understood that actuator may be any aerodynamic shape or size and be made of any material that can withstand the payload delivery.

In the preferred embodiment of the present invention, each actuator is embedded within the canopy and is attached to a structural cell wall and the lower canopy. A control line is attached to the spool within each actuator and extends from the actuator through a small hole in the main housing. It is understood that the control line made be made of any suitable material, such as nylon. A control line system comprises the control line, at least one device, such as a guide ring, that is attached to the trailing edge of the internal sealing flap wherein the control line from the actuator is threaded through the device, and then the attachment of the control line to the parafoil at the intersection of the non-structural cell wall opposite the actuator. Altering the length of the control line with the actuator, wherein the control line is paid out and in, causes the vents to be opened, thereby creating aerodynamic spoilers that enable flight control. It is understood that each actuator may control more than one control line, thereby controlling more than one vent system within a cell.

A control module provides an interface between a controller and the control electronics of the on-canopy actuators. The interface may be wireless or wired. The controller may be positioned anywhere that can maintain a wireless interface between the controller and the on-canopy actuators. In a preferred embodiment of the present invention, each of the actuators may be controlled independently by the controller thereby allowing for symmetric and asymmetric actuation of the spoilers and individual control of the height of each spoiler. In a further embodiment, the control electronics of the on-canopy actuators may be controlled by appropriate means, including, but not limited to cellular, radio, or wired communication.

Other aspects, features, and advantages will become apparent to those skilled in the art from the detailed description and accompanying drawings. It should be understood, however, that the detailed description and accompanying drawings, while indicating preferred embodiments of the present invention, are given by way of illustration and not limitation.

DETAILED DESCRIPTION OF THE INVENTION

Figure 1:
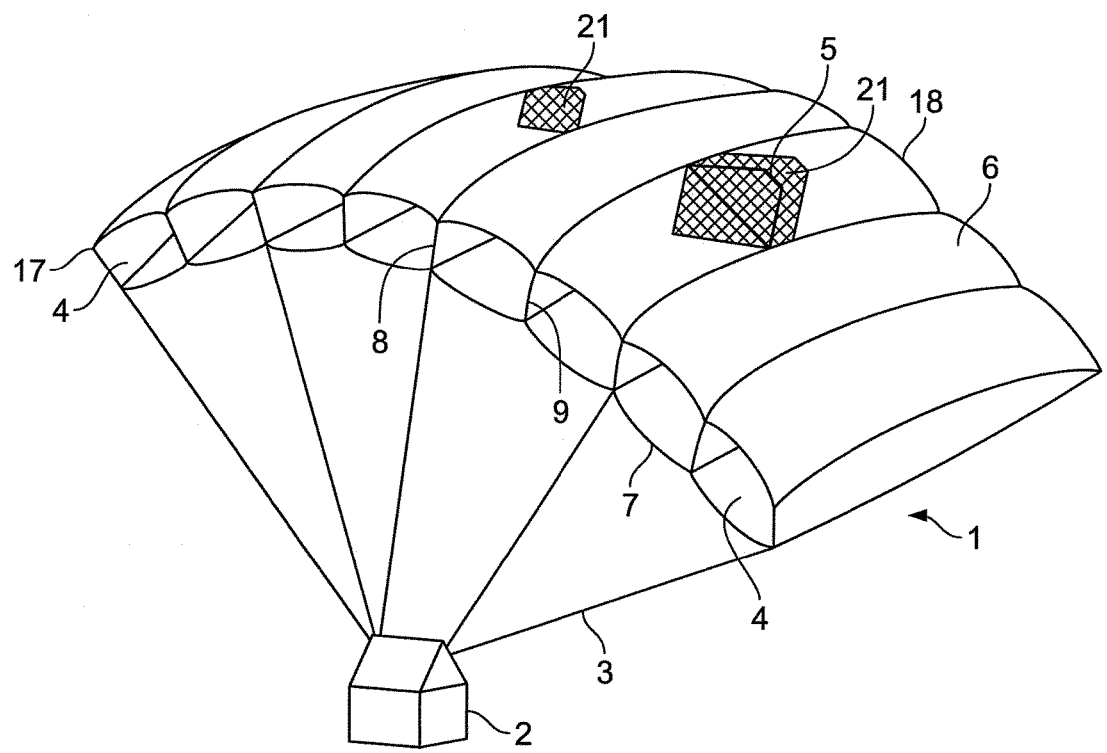
FIG. 1 a schematic of the present invention with a payload.

FIG. 1 is a schematic representation of an embodiment of the parafoil canopy 1 attached to payload rigging lines 3 which are further attached to a payload 2. The parafoil 1 is elliptical in planform and has a trailing edge 18 and a leading edge 17. The parafoil 1 has an upper surface canopy 6 and a lower surface canopy 7 attached to one another by structural cell walls 8 and non-structural cell walls 9 forming cells 4 within the parafoil 1. The structural cell walls 8 are attached to payload rigging lines 3. In the embodiment shown in FIG. 1, at least one cell 4 contains a vent 5 in the upper surface canopy 6, and each vent 5 is covered by a mesh member 21.

Figure 2:
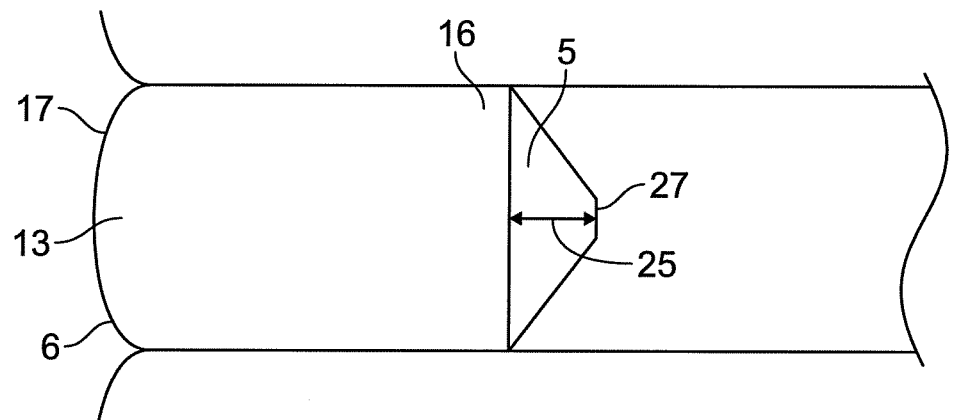
FIG. 2 is a schematic of a preferred embodiment of the vent in the top of the upper surface of the canopy.

FIG. 2 is a schematic representation of an embodiment of top upper surface 13 of upper surface canopy 6 wherein the vent 5 is an isosceles trapezoid wherein the bases (26 and 27) are parallel and the longer base 26 is closest to the leading edge 17. The length 25 of vent 5 is the distance between the bases 26 and 27.

Figure 3:
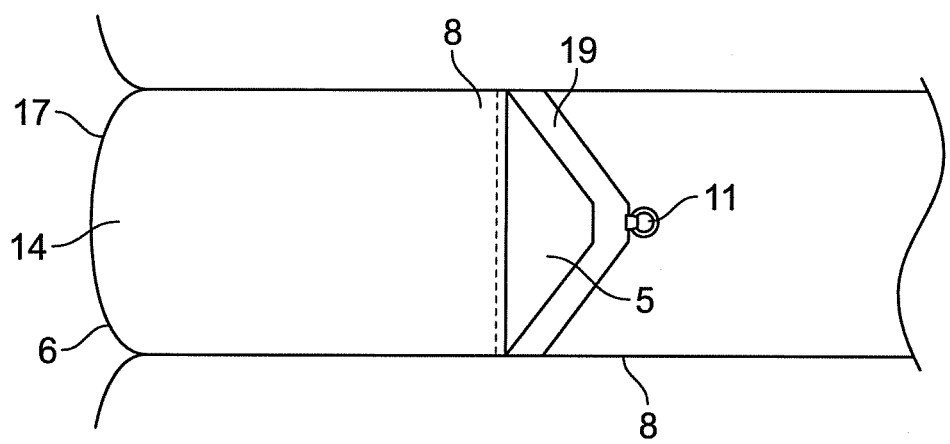
FIG. 3 is a schematic of a preferred embodiment of top of the vent in the upper surface of the canopy and the internal sealing flap.

FIG. 3 is a schematic representation of an embodiment of the bottom upper surface 14 of upper surface canopy 6 wherein sealing flap 19 with guide ring 11 has been attached to the bottom upper surface 14 of upper surface canopy 6. As shown in the embodiment in FIG. 3, the sealing flap 19 is attached to the bottom upper surface 14 of upper surface canopy 6 along the leading edge of vent 5 and along the cell walls 8.

Figure 4:
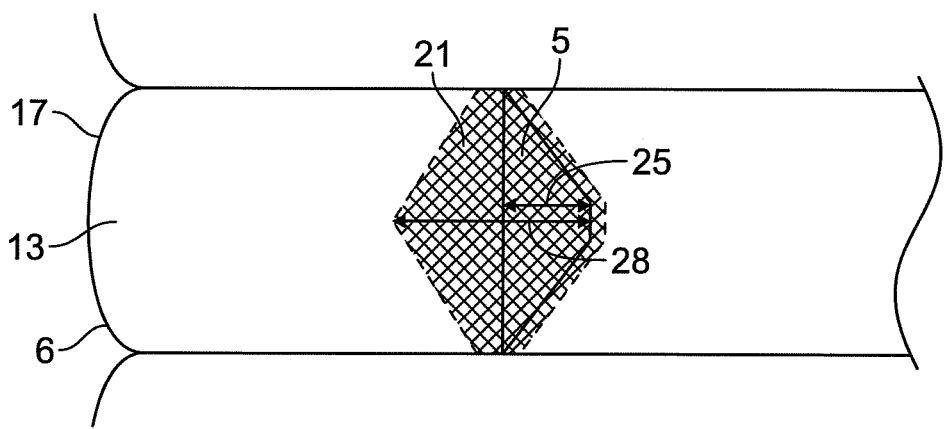
FIG. 4 is a schematic of a preferred embodiment of top of the vent in the upper surface of the canopy and the mesh member covering the vent.

FIG. 4 is a schematic representation an embodiment of top upper surface 13 of upper surface canopy 6 wherein mesh member 21 has been attached to the top upper surface 13 of upper surface canopy 6 to completely cover vent 5. In the embodiment of FIG. 4, the mesh member 21 has been sized and shaped to cover vent 5 and to extend towards leading edge 17 to eliminate deformation of the upper surface canopy 6. As shown in the embodiment in FIG. 4, mesh member 21 has a length 28 that is slightly more than double length 25 of vent 5.

Figure 5:
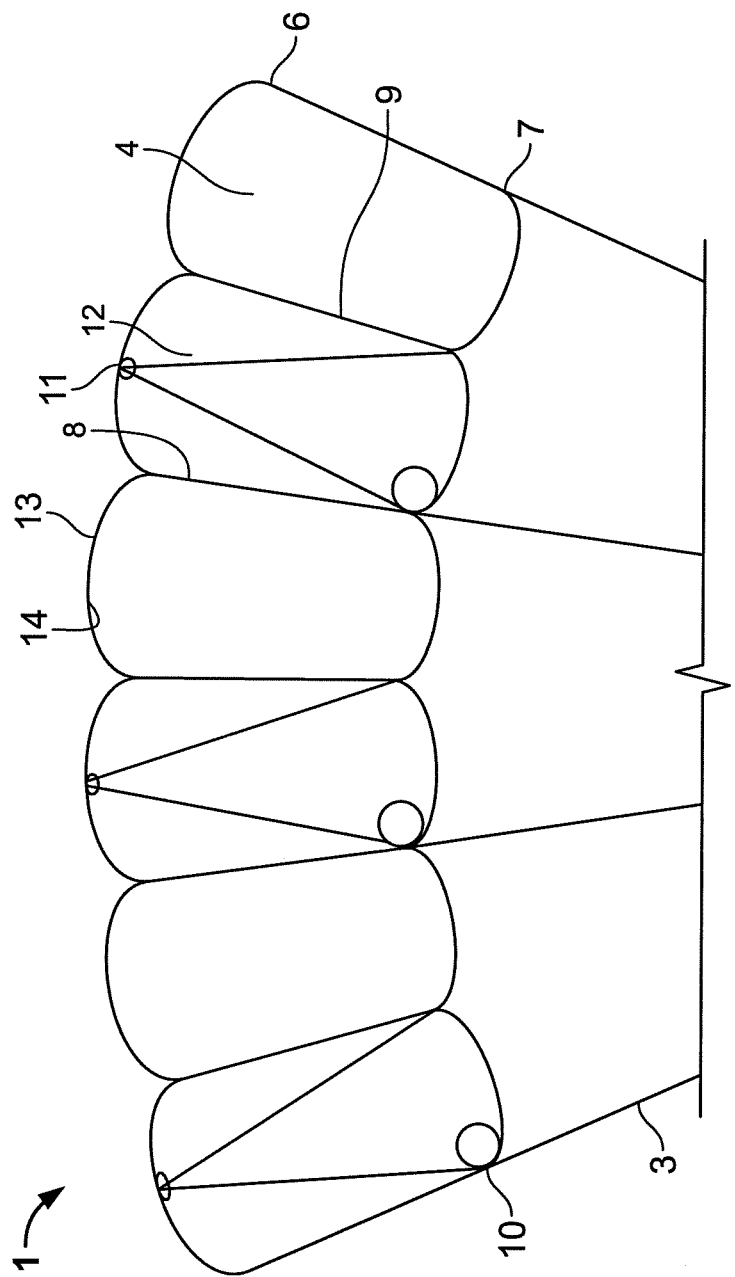
FIG. 5 is a schematic cross-sectional view of the leading edge of the parafoil.

FIG. 5 is a schematic cross-sectional representation of an embodiment of the leading edge of the parafoil 1 wherein the actuator 10 is embedded within parafoil 1. The parafoil 1 has an upper surface canopy 6 and a lower surface canopy 7 attached to one another by structural cell walls 8 and non-structural cell walls 9 forming cells 4 within the parafoil 1. The upper surface canopy 6 comprises a top upper surface 13 and a bottom upper surface 14. The lower surface canopy comprises a top lower surface 15 and a bottom lower surface 16. The structural cell walls 8 are attached to payload rigging lines 3. The actuator 10 is attached within the parafoil 1 at the intersection of a structural cell wall 8 and the lower surface canopy 7. Guide ring 11 is secured to the internal sealing flap (not shown). A control line 12 extends from the actuator 10 to the guide ring 11 and then is attached at the intersection of the lower surface canopy 7 and the non-structural cell wall 9 opposite the actuator 10. The control line 12 is attached to parafoil 1 at the intersection of the lower surface canopy 7 and the non-structural cell wall 9.

Figure 6:
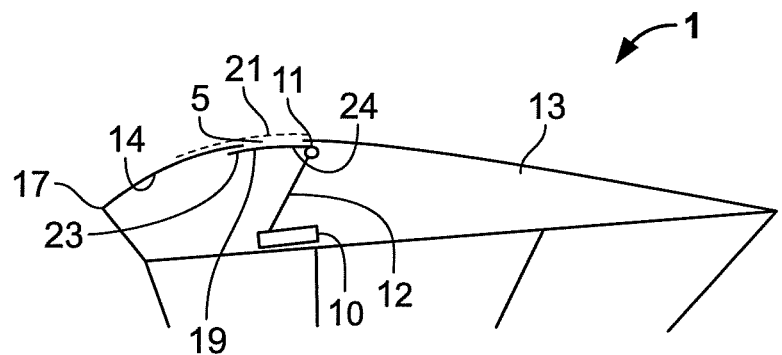
FIG. 6 is a schematic of a side view of a preferred embodiment of the present invention wherein an internal sealing flap has been attached to the bottom of the upper surface of the canopy and a mesh member has been attached to the top of the upper surface of the canopy and covers the vent.

FIG. 6 is a schematic side view of an embodiment of the parafoil 1 with leading edge 17 prior to actuation wherein an internal sealing flap 19 has a leading edge side 23 and a trailing edge side 24. The leading edge side 23 of the internal sealing flap 19 is attached to the upper surface bottom 14 at the edge of vent 5 that is closest to leading edge 17. The internal sealing flap 19 extends across vent 5 and the trailing edge side 24 of internal sealing flap 19 is not attached to the upper surface bottom 14. Guide ring 11 is attached to the internal sealing flap 19 at the trailing edge side 24. Mesh member 21 is attached to the top upper surface 13 covers vent 5 and extends beyond vent 5 towards leading edge 17. The actuator 10 is located beneath vent 5 and the control line 12 travels from the actuator 10 to the guide ring 11. The figure does not show the complete path of the control line 12.

Figure 7:
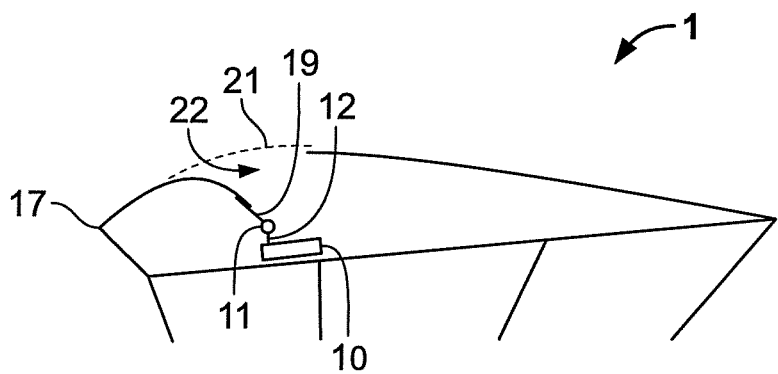
FIG. 7 is a schematic of a side view of a preferred embodiment of the present invention wherein an internal sealing flap has been attached to the bottom of the upper surface of the canopy and a mesh member has been attached to the top of the upper surface of the canopy and covers the vent and actuation has created a spoiler.

FIG. 7 is a schematic side view of an embodiment of the of the parafoil 1 with leading edge 17 wherein the guide ring 11 had been moved by the action of the actuator 10 on control line 12, thereby allowing air to be released to create spoiler 22. The figure does not show the complete path of the control line 12.

Figure 8:
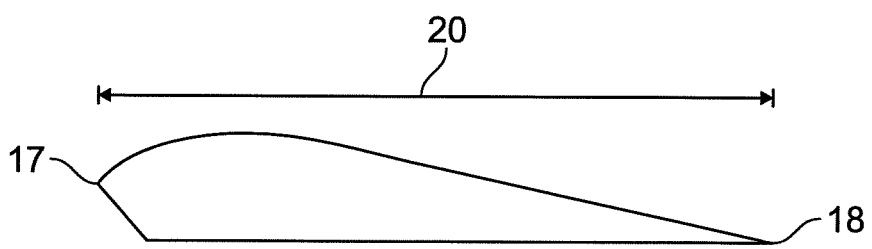
FIG. 8 is schematic of a side view of the parafoil.

FIG. 8 is a schematic side view of parafoil 1 wherein the chord line 20 is the distance from the leading edge 17 to the trailing edge 18.

Figure 9:
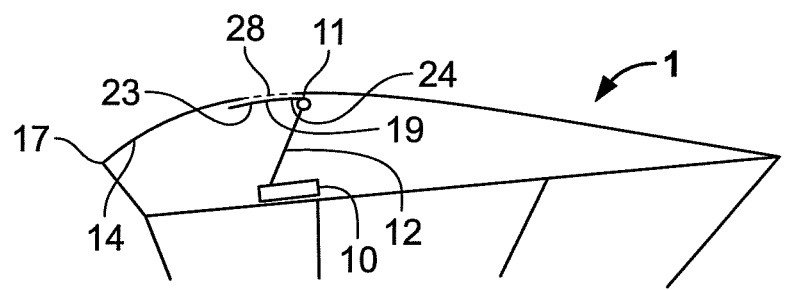
FIG. 9 is a schematic of a side view of a preferred embodiment of the present invention wherein an internal sealing flap has been attached to the bottom of the upper surface of the canopy and a series of apertures within the upper canopy form an upper canopy mesh member.

FIG. 9 is a schematic side view of an embodiment of the parafoil 1 with leading edge 17 prior to actuation wherein an internal sealing flap 19 has a leading edge side 23 and a trailing edge side 24. The leading edge side 23 of the internal sealing flap 19 is attached to the upper surface bottom 14. A plurality of apertures in the upper canopy form an upper canopy mesh member 28. The internal sealing flap 19 extends across upper canopy mesh member 28 and the trailing edge side 24 of internal sealing flap 19 is not attached to the upper surface bottom 14. Guide ring 11 is attached to the internal sealing flap 19 at the trailing edge side 24. The actuator 10 is located beneath canopy mesh member 28 and the control line 12 travels from the actuator 10 to the guide ring 11. The figure does not show the complete path of the control line 12.

Figure 10:
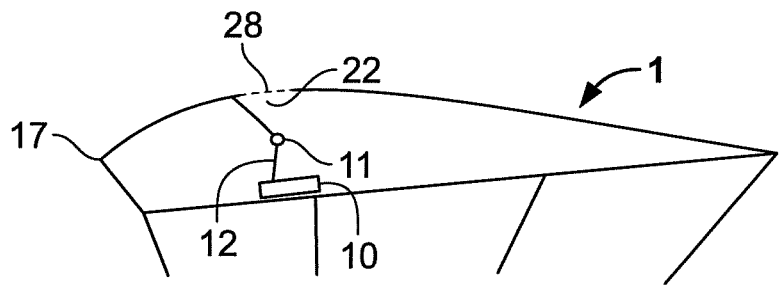
FIG. 10 is a side view of a preferred embodiment of the present invention wherein an internal sealing flap has been attached to the bottom of the upper surface of the canopy and a series of apertures within the upper canopy form an upper canopy mesh member and actuation has created a spoiler.

FIG. 10 is a schematic side view of an embodiment of the parafoil 1 with leading edge 17 wherein the guide ring 11 had been moved by the action of the actuator 10 on control line 12, thereby allowing air to be released by canopy mesh member 28 to create spoiler 22. The figure does not show the complete path of the control line 12.

Figure 11:
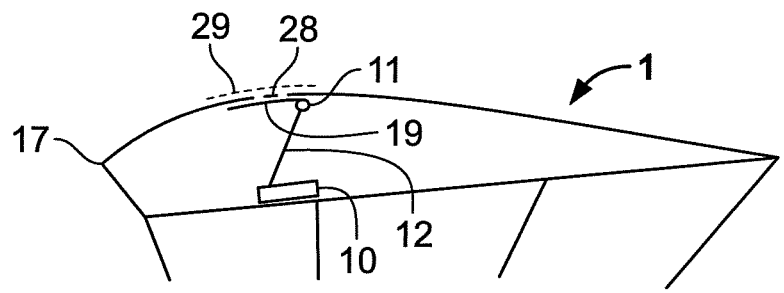
FIG. 11 is a schematic of a side view of a preferred embodiment of the present invention wherein an internal sealing flap has been attached to the bottom of the upper surface of the canopy and a series of apertures within the upper canopy form an upper canopy mesh member and a second mesh member has been attached to the upper surface of the canopy.

FIG. 11 is a schematic side view of an embodiment of the parafoil 1 with leading edge 17 prior to actuation wherein an internal sealing flap 19 extends across upper canopy mesh member 28. A second mesh member 29 is attached to the top upper surface 13 and covers upper canopy mesh member 28. The actuator 10 is located beneath canopy mesh member 28 and the control line 12 travels from the actuator 10 to the guide ring 11. The figure does not show the complete path of the control line 12.

We claim:

1. A system to control the flight path of a parafoil carrying a payload comprising:

a parafoil canopy comprising:
  a canopy upper surface comprising a top and a bottom,
  a canopy lower surface comprising a top and a bottom, wherein the canopy upper surface and canopy lower surface are connected by a cell structure wherein the cell structure comprises a plurality of structural cell walls and a plurality of non-structural cell walls thereby creating a plurality of cells within the parafoil canopy between the canopy upper surface and the canopy lower surface,
  a leading edge and a trailing edge,
  a chord line,
  at least one vent system located in the upper canopy of at least one cell, wherein each vent system further comprises:
    an aperture located in the top upper canopy surface, comprising an aperture leading edge and an aperture trailing edge,
    a mesh member secured to the upper canopy comprising a mesh member leading edge and a mesh member trailing edge, wherein the mesh member completely covers the aperture,
    an internal sealing flap comprising an internal flap leading edge comprising a top and a bottom and an internal flap trailing edge comprising an top and a bottom, wherein the internal flap leading edge is secured to the upper canopy and the internal flap trailing edge extends to at least the aperture trailing edge,
    an actuation system comprising:
      actuator further comprising at least one control means wherein the control means controls actuation of the actuator, and the actuator is located within a cell comprising at least one vent system and is secured to the parafoil canopy at an intersection of the top of the canopy lower surface and a structural cell wall, and
      at least one control line system comprising:
        a control line having a predetermined length, wherein the control line is secured to the actuator and the predetermined length of the control line may be adjusted by actuation of the actuator, and
        at least one device for receiving the control line secured to the internal flap trailing edge wherein the control line extends from the actuator, through the at least one device for receiving the control line and is attached to the parafoil canopy at an intersection of the top of the canopy lower surface and a cell wall opposite the actuator; and
  a control module wherein said control module comprises a means for communication with the control means of each of actuator.

2. The system of claim 1 wherein at least one actuation system further comprises a plurality of control line systems, wherein each control line system allows for the actuation of separate vent systems.

3. The system of claim 2 wherein at least one device for receiving the control line is a guide ring.

4. The system of claim 2 wherein at least one cell within the parafoil comprises a plurality of vent systems.

5. The system of claim 4 wherein at least one actuation system further comprises a plurality of control line systems, wherein each control line system allows for the actuation of separate vent systems within the at least one cell comprising a plurality of vent systems.

6. The system of claim 1 wherein at least one device for receiving the control line is a guide ring.

7. The system of claim 6 wherein at least one cell within the parafoil comprises a plurality of vent systems.

8. The system of claim 1 wherein at least one cell within the parafoil comprises a plurality of vent systems.

9. A system to control the flight path of a parafoil carrying a payload comprising:
  a parafoil canopy comprising:
    a canopy upper surface comprising a top and a bottom,
    a canopy lower surface comprising a top and a bottom, wherein the canopy upper surface and canopy lower surface are connected by a cell structure wherein the cell structure comprises a plurality of structural cell walls and a plurality of non-structural cell walls thereby creating a plurality of cells within the parafoil canopy between the canopy upper surface and the canopy lower surface,
    a leading edge and a trailing edge,
    a chord line,
    at least one vent system located in the upper canopy of at least one cell, wherein each vent system further comprises:
      an upper canopy mesh member comprising a plurality of apertures, an upper canopy mesh member leading edge and an upper canopy mesh member trailing edge,
      an internal sealing flap comprising an internal flap leading edge comprising a top and a bottom and an internal flap trailing edge comprising an top and a bottom, wherein the internal flap leading edge is secured to the upper canopy and the internal flap trailing edge extends to at least the upper canopy mesh member trailing edge,
      an actuation system comprising:
        an actuator further comprising at least one control means wherein the control means controls actuation of the actuator, and the actuator is located within a cell comprising at least one vent system and is secured to the parafoil canopy at an intersection of the top of the canopy lower surface and a structural cell wall, and
        at least one control line system comprising:
          a control line having a predetermined length, wherein the control line is secured to the actuator and the predetermined length of the control line may be adjusted by actuation of the actuator, and
          at least one device for receiving the control line secured to the internal flap trailing edge wherein the control line extends from the actuator, through the at least one device for receiving the control line and is attached to the parafoil canopy at an intersection of the top of the canopy lower surface and a cell wall opposite the actuator; and
    a control module wherein said control module comprises a means for communication with the control means of each of actuator.

10. The system of claim 9 wherein the vent system further comprises a second mesh member secured to the upper canopy, wherein the second mesh member completely covers upper canopy mesh member.

11. The system of claim 10 wherein at least one actuation system further comprises a plurality of control line systems, wherein each control line system allows for the actuation of separate vent systems.

12. The system of claim 10 wherein the at least one device for receiving the control line is a guide ring.

13. The system of claim 10 wherein at least one cell within the parafoil comprises a plurality of vent systems.

14. The system of claim 9 wherein at least one actuation system further comprises a plurality of control line systems, wherein each control line system allows for the actuation of separate vent systems.

15. The system of claim 14 wherein the at least one device for receiving the control line is a guide ring.

16. The system of claim 14 wherein at least one cell within the parafoil comprises a plurality of vent systems.

17. The system of claim 9 wherein the at least one device for receiving the control line is a guide ring.

18. The system of claim 17 wherein at least one cell within the parafoil comprises a plurality of vent systems.

19. The system of claim 9 wherein at least one cell within the parafoil comprises a plurality of vent systems.

20. The system of claim 19 wherein at least one actuation system further comprises a plurality of control line systems, wherein each control line system allows for the actuation of separate vent systems within the at least one cell comprising a plurality of vent systems.

* * * * *